US010323620B2

(12) United States Patent
Sabourin et al.

(10) Patent No.: US 10,323,620 B2
(45) Date of Patent: Jun. 18, 2019

(54) HYDRAULIC TURBINE, AND POWER CONVERSION FACILITY INCLUDING SUCH A TURBINE

(71) Applicant: ALSTOM Renewable Technologies, Grenoble (FR)

(72) Inventors: Michel Sabourin, Sorel-Tracy (CA); Laurent Bornard, Saint-Ours (CA); Sébastien Beaulieu, Verchères (CA)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 601 days.

(21) Appl. No.: 14/858,234

(22) Filed: Sep. 18, 2015

(65) Prior Publication Data

US 2016/0010618 A1 Jan. 14, 2016

Related U.S. Application Data

(63) Continuation of application No. PCT/FR2013/050587, filed on Mar. 19, 2013.

(51) Int. Cl.
*F04D 29/38* (2006.01)
*F03B 11/00* (2006.01)
*F03B 3/02* (2006.01)

(52) U.S. Cl.
CPC .............. *F03B 11/002* (2013.01); *F03B 3/02* (2013.01); *Y02E 10/223* (2013.01); *Y02E 10/226* (2013.01)

(58) Field of Classification Search
CPC ................................. F03B 11/002; F03B 3/02
See application file for complete search history.

(56) References Cited

U.S. PATENT DOCUMENTS

| 3,237,565 A | 3/1966 | Hartland | |
|---|---|---|---|
| 4,898,512 A | 2/1990 | Geffs | |
| 5,653,577 A * | 8/1997 | Wuhrer | F03B 3/02 415/1 |
| 5,823,740 A * | 10/1998 | Cybularz | F03B 3/02 415/115 |

(Continued)

FOREIGN PATENT DOCUMENTS

| EP | 0 571 690 A1 | 12/1993 |
|---|---|---|
| GB | 750 862 A | 6/1956 |
| GB | 850 112 A | 9/1960 |

OTHER PUBLICATIONS

"Methods for Air Admission in Hydroturbines" B. Papillon et al, Systems $21^{st}$ AIHR Symposium, Sep. 9-12, 2002, Lausanne, Switzerland.

*Primary Examiner* — Kayla Mccaffrey
(74) *Attorney, Agent, or Firm* — Dority & Manning, P.A.

(57) ABSTRACT

Said hydraulic turbine includes a wheel which is made to rotate about a rotational axis ($X_2$) by a main water stream ($F_1$) going from a penstock to a suction tube along a flow path that passes through the wheel. Said turbine also includes first means that are placed outside the flow path of the main water stream ($F_1$) and enable the mixing of a secondary water stream ($F_2$), taken from the flow path and located upstream from the wheel, and an oxygen-containing gas ($A_2$). Said turbine also includes second means for injection, downstream from the wheel of the turbine, a water/gas mixture ($F_3$) produced in the first means.

15 Claims, 2 Drawing Sheets

(56) References Cited

U.S. PATENT DOCUMENTS

| | | | | |
|---|---|---|---|---|
| 5,879,130 A | * | 3/1999 | Beyer | F03B 3/125 |
| | | | | 415/115 |
| 5,941,682 A | * | 8/1999 | Cybularz | F03B 3/125 |
| | | | | 415/115 |
| 6,155,783 A | * | 12/2000 | Beyer | F03B 3/02 |
| | | | | 29/469.5 |

* cited by examiner

HYDRAULIC TURBINE, AND POWER CONVERSION FACILITY INCLUDING SUCH A TURBINE

CROSS-REFERENCE TO RELATED APPLICATIONS

This application claims priority to PCT/FR2013/050587 filed Mar. 19, 2013, which is hereby incorporated in its entirety.

TECHNICAL FIELD

The invention relates to a hydraulic turbine and to an energy conversion installation comprising such a turbine.

In the field of the conversion of hydraulic energy into electrical or mechanical energy, it is known to use a turbine, for example a Francis turbine, for driving in rotation a shaft bearing a runner of the turbine, this shaft being connected to an alternator. Such a turbine is integrated into an installation which comprises, inter alia, a water reservoir which is connected to a scroll casing supplying the turbine by means of a forced duct.

In certain installations, in particular those used in relatively hot climates, and toward the end of summer, it is possible that the water coming from the water reservoir through the forced duct has a low level of dissolved oxygen, due to the fact that this water is drawn from a relatively great depth in the water reservoir, where the oxygen content is such that aquatic life cannot exist. In this case, in order to allow aquatic life to develop downstream of the installation, the water passing through the turbine must be enriched with oxygen.

To that end, it is known to put in place, on the flow path of a water flow passing through the runner of the turbine, means for oxygenating this water flow, as set out in the article "*Methods for air admission in hydroturbines*" by B. Papillon, M. Couston, C. Deschenes, M. Sabourin, published in *Proceedings of the Hydraulic Machinery and Systems 21$^{st}$ AIHR symposium* (Sep. 9-12, 2002, Lausanne). Such systems disturb this water flow, which reduces the efficiency of the installation over the entire year, whereas the problem linked to supplying the turbine with air-depleted water arises only in certain circumstances.

It is these drawbacks which the invention is to address more particularly, by proposing a novel hydraulic turbine which is able to operate with water having a low level of dissolved oxygen and whose efficiency is not markedly reduced as a consequence of the measures undertaken for increasing the level of dissolved oxygen in the water, when this is necessary.

SUMMARY

To that end the invention relates to a hydraulic turbine comprising a runner rotating about an axis of rotation under the action of a main water flow traveling from a forced duct toward a draft tube along a flow path which passes through the runner of the turbine. According to the invention, this turbine comprises:
first means which are arranged outside the flow path of the main water flow and by means of which it is possible to mix, on one hand, a secondary water flow drawn from the flow path, upstream of the runner of the turbine, and, on the other hand, a gas containing oxygen and
second means for injecting, downstream of the runner of the turbine, a water-gas mixture created in the first means.

By virtue of the invention, the first means, which are arranged outside the flow path of the main water flow, do not disturb this main water flow which can therefore be used in optimal conditions for driving in rotation the runner of the turbine. When it is necessary to increase the oxygen content of the water leaving the turbine, the first means may be implemented, drawing the secondary water flow from the flow path, for example in the forced duct. When that is not necessary, in particular depending on climatic conditions, the secondary water flow is not drawn and the first and second means of the invention have no influence on the efficiency of the installation comprising the hydraulic turbine of the invention.

According to advantageous but non-essential aspects of the invention, such a turbine may incorporate one or more of the following features, in any technically permissible combination:
The first means comprise a mixing chamber which is supplied, on one hand, with water via a first line connected to the flow path and, on the other hand, with gas via a second line which is supplied with gas containing oxygen.
The mixing chamber comprises a Venturi effect hydroinjector, a system excited by a piezoelectric element, a cavitating vortex system, a porous mesh or a combination of these means.
The first means are provided to mix the secondary water flow with air. In this case, the second line can be connected to the atmosphere.
As a variant, the second line is connected to a reservoir of gas containing oxygen, preferably under pressure.
The turbine comprises means, for controlling the flow rate of the secondary water flow, between the flow path and the first means.
The means for controlling the flow rate of the secondary water flow comprise at least one first valve arranged on the first line.
The turbine comprises means for controlling the flow rate of gas supplied to the first means.
The means for controlling the flow rate of gas comprise at least one second valve arranged on the second line.
The means for controlling the flow rate of the secondary water flow and/or the means for controlling the flow rate of gas comprise a control unit for the first valve and/or for the second valve.
The second means comprise a distributor equipped with one or more nozzles arranged on a wall of the draft tube and oriented toward a central axis of this tube.
When the injector comprises multiple nozzles, these nozzles are preferably distributed regularly about the central axis of the draft tube.
When the injector comprises multiple nozzles, the distributor advantageously comprises a chamber, between the nozzles, for distributing the water-gas mixture coming from the first means, this chamber being arranged radially around the nozzles.
The distributor comprises a deflector arranged in the draft tube, downstream of the nozzles.
The secondary water flow is drawn from the forced duct. As a variant, it is drawn from a scroll casing for distributing the main water flow or from a water reservoir supplying the turbine.
The turbine of the invention may be a Francis turbine or a turbine of the propeller, bulb or Kaplan type.

The invention also relates to an installation for converting hydraulic energy into electrical or mechanical energy, which comprises a turbine as mentioned hereinabove, and also a forced duct for supplying this turbine with a main water flow and a draft tube for evacuating the main water flow leaving the turbine, whereas the first means are selectively supplied with a secondary water flow drawn from the flow path, upstream of the runner of the turbine, and with a flow of gas containing oxygen at atmospheric pressure.

BRIEF DESCRIPTION OF THE DRAWINGS

The invention will be better understood and other advantages thereof will become clearer in light of the following description of two embodiments of a turbine and of an installation in accordance with the principle thereof, which description is given purely by way of example and with reference to the appended drawings, in which:

FIG. 3 is a detail section corresponding to the plane of FIG. 2, for a second embodiment of the invention.

DETAILED DESCRIPTION

Figure 1:
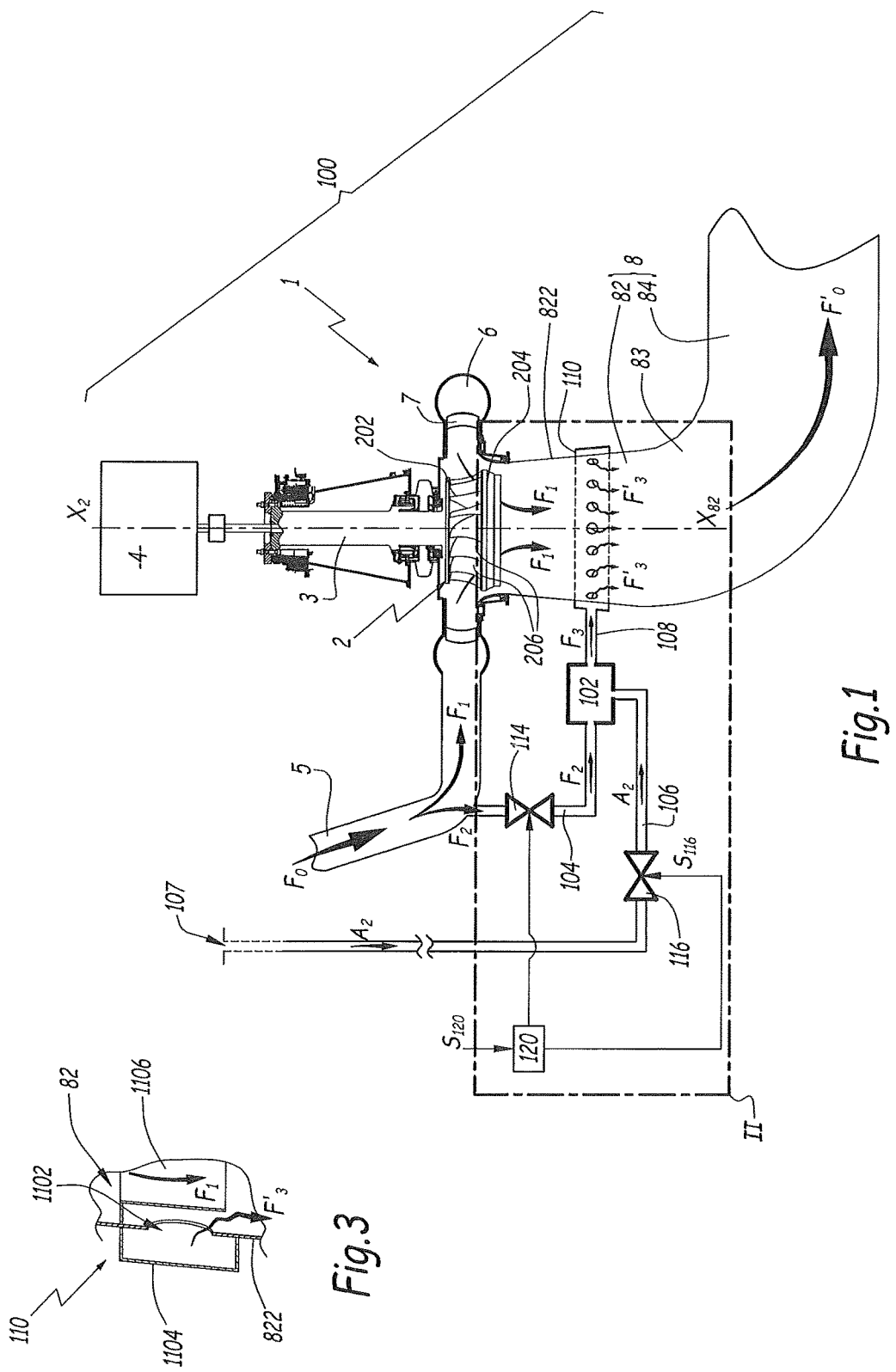
FIG. 1 is a diagrammatic representation, in axial section, of an installation in accordance with the invention.
Figure 2:
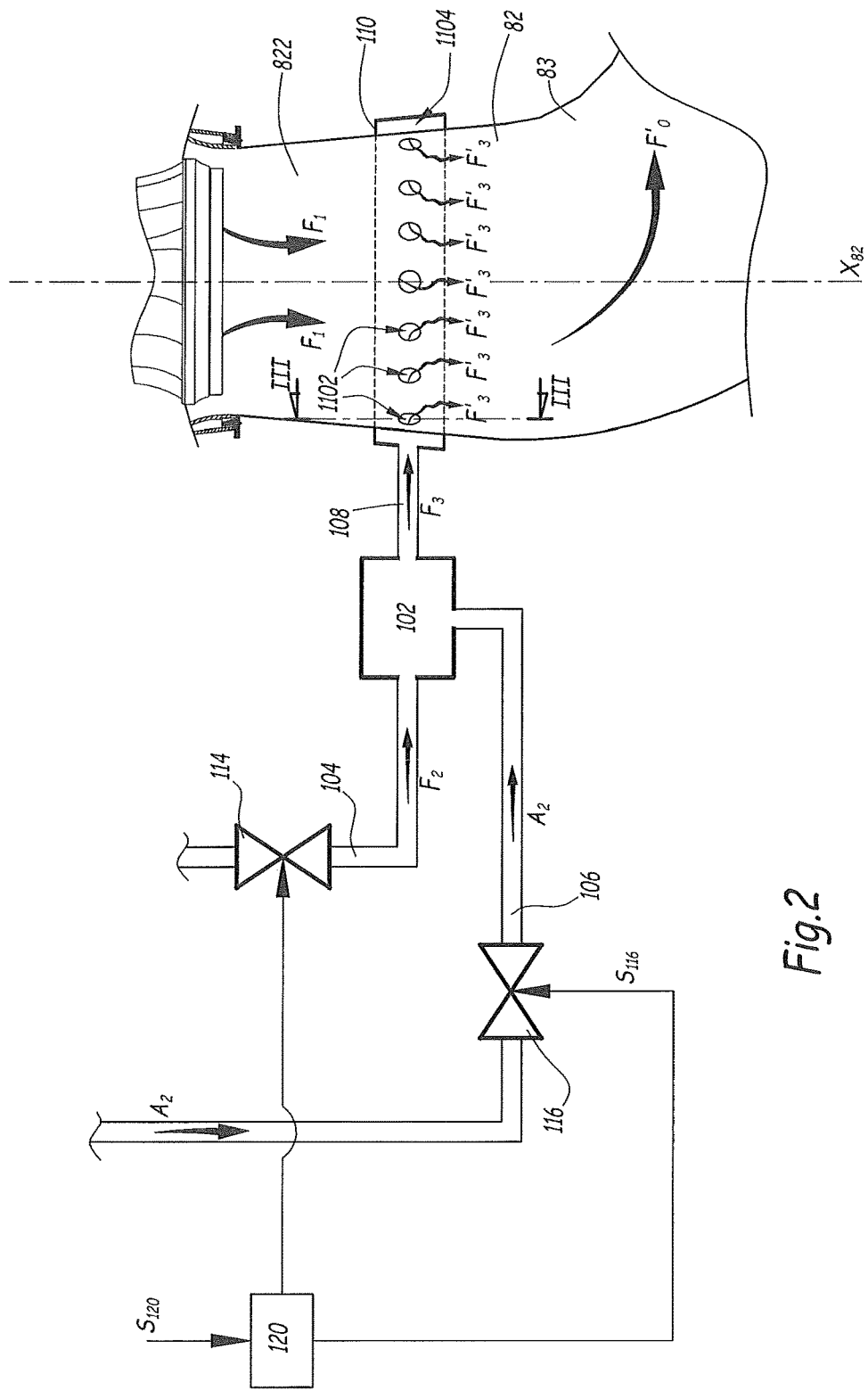
FIG. 2 is an enlarged view of detail II of FIG. 1

The installation 100 shown in FIG. 1 comprises a Francis-type turbine 1 whose runner 2 is designed to be set in rotation about a vertical axis $X_2$ by means of a main water flow shown by arrows $F_1$. This main water flow $F_1$ comes from a water reservoir which is not shown. In FIG. 1, for the sake of clarity, the runner 2 is shown in external view. A shaft 3 supports the runner 2 and is coupled to an alternator 4 which provides an alternating current to an electrical grid (not shown). The installation 100 thus makes it possible to convert the hydraulic energy of the main water flow $F_1$ into electrical energy.

The installation 100 may comprise multiple turbines 1 supplied from the same water reservoir.

As a variant, the shaft 3 may be coupled to a mechanical assembly, in which case the installation 100 converts the hydraulic energy of the main water flow $F_1$ into mechanical energy.

A forced duct 5 brings the main water flow F1 to the runner 2 and extends between the water reservoir and a scroll casing 6 for distributing the flow F1, equipped with wicket gates 7 which orient the main water flow F1. A draft tube or duct 8 is provided downstream of the turbine 1, in the direction of the main water flow F1, for evacuating this water flow and returning it toward the bed of a river, or toward a downstream reservoir when the turbine 1 is a pump-turbine.

The duct 8 comprises a first segment 82 which is generally frustoconical, is centered on an axis $X_{82}$ which coincides with the axis $X_2$, and is diverging downwards. The duct 8 also comprises a second segment 83 in the form of an approximately 90° bend, and a third generally horizontal segment 84. Leaving the runner 2, the water leaving the turbine 1 passes in succession through the segments 82, 83 and 84 of the duct 8.

The runner 2 comprises a crown 202, a band 204 and multiple blades 206 distributed about the axis $X_2$ which is an axis of symmetry for the crown 202 and the band 204. The blades 206 define, between them and between the crown 202 and the band 204, flow ducts for the main water flow $F_1$ within the runner 2, between the scroll casing 6 and the draft duct 8.

The duct 5, the scroll casing 6, the wicket gates 7, the runner 2 and the duct 8 together define a flow path for the main water flow $F_1$.

In order to take account of the case in which the level of dissolved oxygen in the water provided to the runner 2 is low, in particular when this water is drawn from a great depth in the water reservoir, toward the end of summer and when the installation 100 is used in a relatively hot climate, a mixing chamber 102 is provided close to segment 82 of the draft duct 8. This mixing chamber 102 is supplied with water, from the forced duct 5, by means of a first line 104 which connects the forced duct 5 to the mixing chamber 102. The mixing chamber 102 is also supplied with air by means of a second line 106 whose opening 107 is in communication with the atmosphere. Thus, the second line 106 makes it possible to supply the mixing chamber 102 with air at atmospheric pressure. The mixing chamber 102 comprises baffles (not shown) placed on the flow path of the water inside this chamber, as well as orifices, distributed within this chamber, out of which flows the air from the second line 106. Thus, a two-phase mixture of water and air is created in the chamber 102.

The structure of the mixing chamber 102 depends on a design choice. It comprises a Venturi effect hydro-injector. As a variant, the mixing chamber 102 comprises a system excited with a piezoelectric element, a cavitating vortex system or a porous mesh or a combination of these different means. Other types of mixing chamber are conceivable.

A first valve 114 is mounted on the line 104, while a second valve 116 is mounted on the line 106. The valves 114 and 116 are solenoid valves controlled by an electronic unit 120 by means of two electronic signals $S_{114}$ and $S_{116}$. They make it possible to selectively prevent or allow water and air to flow respectively in lines 104 and 106. The unit 120 is thus able, as a function of an electronic signal $S_{120}$ received from an external measuring means or from an operator, to control the valves 114 and 116 so as to allow or prevent the supply of, respectively, water from the forced duct 5 and air from the atmosphere, to the mixing chamber 102.

The valves 114 and 116 may be "all or nothing" valves. In this case they make it possible to control the values of the flow rates of water $F_2$ and air $A_2$ between a zero value and a maximum value. As a variant, these valves are proportional valves, which makes it possible to adjust these flow rates, in particular as a function of the flow rate in the forced duct 5 or of the atmospheric pressure. When the first valve 114 is open, a secondary water flow $F_2$ flows, from the forced duct 5 and through the line 104, into the mixing chamber 102. When the second valve 116 is open, air flows in the line 106 into the mixing chamber 102, as shown by the arrows $A_2$. The secondary water flow $F_2$ and the airflow $A_2$ then combine in the mixing chamber 102 and flow thence, in the form of a flow $F_3$ of a two-phase mixture of water and air, into the distributor 110, whence this flow re-emerges into the segment 82 in the form of individual flows $F'_3$ of water-air mixture. These individual flows $F'_3$ open into the draft duct 8 through nozzles 1102 belonging to the distributor 110 and distributed over the periphery of the segment 82, about the axis $X_{82}$. The distributor 110 comprises a distribution chamber 1104 which extends at least partially around the segment 82 and by means of which it is possible to regularly distribute the flow of mixture $F_3$ which is split into multiple flows $F'_3$ at the various nozzles 1102. The nozzles 1102 consist of orifices created in the wall 822. The nozzles or orifices 1102 are oriented toward the axis $X_{82}$.

In practice, the respective water and air supply pressures to the mixing chamber 102 are such that air bubbles of several tenths of a millimeter in size are created in the flow $F_3$. These bubbles are stable at least until the individual flows $F'_3$ discharge into the segment 82, downstream of the runner 2.

The segment 82 is a region of relatively low pressure in the main water flow $F_1$, which promotes mixing between the flows $F_1$ and $F'_3$, in particular since the flow $F_1$ leaving the runner 2 is very turbulent. Thus, elements 102 to 120 make it possible, when necessary, to inject the flow $F_3$ of water-air mixture downstream of the runner 2, that is to say into a region of the installation 100 in which the pressure of the water is relatively low, in particular lower than in the forced duct 5. This flow $F_3$ of water-air mixture then combines with the main water flow $F_1$, which makes it possible to increase the air content in the flow of water leaving the turbine 1, this flow being the sum of the flows $F_1$ and $F_3$.

In these conditions, the total water flow $F_0$, drawn from the water reservoir and flowing in the forced duct 5, is split into the main water flow $F_1$ and the secondary water flow $F_2$, whereas the total flow $F'_0$ leaving the turbine is the sum of flows $F_1$ and $F_3$.

When, taking into account the signal $S_{120}$, the unit 120 determines that it is not necessary to increase the level of dissolved oxygen in the main water flow $F_1$ passing through the runner 2, the valves 114 and 116 are closed and the elements 102 to 116 have no influence on the operation of the turbine 1. In particular, they do not reduce the overall efficiency of the installation 100. This is in particular due to the fact that the elements 102 to 116 are installed outside the flow path of the flow $F_1$.

In these conditions, the water flows $F_0$, $F'_0$ and $F_1$ have the same flow rate and the flow rate of the secondary water flow is zero.

It is also noted that, as these elements 102 to 116 are located outside the path of the flow $F_1$, the elements 2, 3 and 5 to 8 may be standard elements, which is advantageous in terms of design and maintenance.

In the second embodiment of the invention, shown in FIG. 3, the elements which are similar to those of the first embodiment bear the same references. In what follows, the description focuses on the differences between this first embodiment and the preceding embodiment.

The distributor 110 of this embodiment also comprises a distribution chamber 1104 which supplies various orifices or nozzles 1102 created in the wall 822 of a segment 82 of the draft tube. An annular deflector 1106 is arranged, within the segment 82, level with the nozzles 1102. This deflector is secured to the wall 822 above the nozzles 1102 and makes it possible to create, close to these nozzles and under the effect of the main water flow $F_1$, a region of low pressure, which sucks in the individual flows $F'_3$ of the two-phase mixture of water and air into the draft duct 8.

The present invention can be the subject of various arrangements and modifications.

In particular, it can be implemented with turbines other than a Francis turbine, in particular with a turbine of the propeller, bulb or Kaplan type. The invention may also be implemented with a pump-turbine.

Instead of a distributor 110 comprising multiple nozzles or orifices and a distribution chamber, other types of distributors may be envisaged. For example, the nozzles may be replaced by a continuous or discontinuous groove on the periphery of the suction unit, or by a single injection nozzle.

As a variant, the air flow $F_3$ may be injected into another part of the turbine 1, as long as this is a region of relatively low pressure in the main water flow $F_1$, downstream of the runner of the turbine.

According to another variant, the secondary water flow $F_2$ may be drawn from another part of the path of the main water flow $F_1$. This can in particular be the case at the scroll casing 6 or in the water reservoir.

According to another variant, a gas other than air and containing oxygen may be supplied to the mixing chamber 102. This gas may be supplied from a dedicated reservoir, preferably under pressure and installed close to the turbine 1.

According to another variant, pumps and/or compressors may be installed on the lines 104 and 106 in order to ensure that the mixing chamber 102 is supplied with water and with oxygen-containing gas, respectively, at sufficient pressure.

The technical features of the embodiments and variants set forth hereinabove may be combined with one another to give rise to novel embodiments.

The invention claimed is:

1. A hydraulic turbine, comprising:
   a runner rotating about an axis of rotation under the action of a main water flow (F1) traveling from a forced duct toward a draft duct along a flow path passing through the runner of the turbine;
   first means which are arranged outside the flow path of the main water flow (F1) and by means of which it is possible to mix a secondary water flow (F2) and a gas containing oxygen (A2), the first means comprising:
      a first line in communication with the forced duct upstream of where the forced duct introduces the main water flow to the runner;
      a mixing chamber located externally of the draft duct and runner and formed separately from the runner, the draft duct disposed at a discharge from the runner, the first line carrying the secondary water flow to the mixing chamber;
      a second line in communication with an air source and with the mixing chamber to introduce air into the mixing chamber;
   second means for injecting, downstream of the runner of the turbine into the draft duct, a water-gas mixture (F3) created in the mixing chamber, the second means comprising:
      a distributor arranged around a periphery of the draft duct downstream of the runner, the distributor in flow communication with the mixing chamber and comprising a plurality of nozzles that are formed in a wall of the draft duct and direct the water-gas mixture into the draft duct transverse to a vertical rotational axis of the runner.

2. The turbine as claimed in claim 1, wherein the mixing chamber comprises any one or combination of a Venturi effect hydro-injector, a system excited by a piezoelectric element, a cavitating vortex system, or a porous mesh.

3. The turbine as claimed in claim 1, wherein the second line is connected to atmosphere.

4. The turbine as claimed in claim 1, wherein the second line is connected to a reservoir of pressurized gas containing oxygen.

5. The turbine as claimed in claim 1, further comprising a controllable and remotely actuated first valve configured in the first line to control the flow rate of the secondary water flow (F2) to the mixing chamber.

6. The turbine as claimed in claim 1, further comprising a controllable and remotely actuated second valve configured in the second line to control the flow rate of gas (A2) supplied to the mixing chamber.

7. The turbine as claimed in claim 1, wherein the nozzles are distributed regularly about a central axis ($X_{82}$) of the draft duct.

8. The turbine as claimed in claim 7, wherein the distributor comprises a chamber arranged radially around the nozzles to distribute the water-gas mixture radially around the draft duct to the nozzles.

9. The turbine as claimed in claim 7, wherein the distributor comprises a deflector secured to the wall of the draft duct above the nozzles such that the deflector is arranged level with the nozzles.

10. The turbine as claimed claim 1, wherein the secondary water flow (F2) is drawn from the forced duct upstream of a scroll casing component of the forced duct that distributes the main water flow into the runner.

11. The turbine as claimed in claim 1, wherein the secondary water flow (F2) is drawn from a scroll casing component of the forced duct that distributes the main water flow (F1) into the runner.

12. The turbine as claimed in claim 1, wherein the turbine is of Francis type.

13. The turbine as claimed in claim 1, wherein the turbine is of propeller type, bulb type, or Kaplan type.

14. An installation for converting hydraulic energy into electrical or mechanical energy, the installation comprising a turbine as claimed in claim 1.

15. A hydraulic turbine, comprising:
a runner rotating about an axis of rotation under the action of a main water flow (F1) traveling from a forced duct toward a draft duct along a flow path passing through the runner of the turbine;
first means which are arranged outside the flow path of the main water flow (F1) and by means of which it is possible to mix a secondary water flow (F2) and a gas containing oxygen (A2), the first means comprising:
   a first line in communication with the forced duct upstream of where the forced duct introduces the main water flow to the runner;
   a mixing chamber located externally of the draft duct and runner and formed separately from the runner, the draft duct disposed at a discharge from the runner, the first line carrying the secondary water flow to the mixing chamber;
   a second line in communication with an air source and with the mixing chamber to introduce air into the mixing chamber;
second means for injecting, downstream of the runner of the turbine into the draft duct, a water-gas mixture (F3) created in the mixing chamber, the second means comprising:
   a distributor arranged around a periphery of the draft duct downstream of the runner, the distributor in flow communication with the mixing chamber to direct the water-gas mixture into the draft duct.

\* \* \* \* \*